United States Patent [19]

Wilson

[11] Patent Number: 4,767,988
[45] Date of Patent: Aug. 30, 1988

[54] PRECISION MAGNETOMETER ORIENTATION DEVICE

[75] Inventor: Harold S. Wilson, Victoria, Canada

[73] Assignee: Her Majesty the Queen in right of Canada, as represented by the Minister of National Defence, Ottawa, Canada

[21] Appl. No.: 877,646

[22] Filed: Jun. 13, 1986

[30] Foreign Application Priority Data

Jun. 20, 1985 [CA] Canada .................................. 484692

[51] Int. Cl.[4] ........................ G01C 17/28; G01V 3/40; G05D 1/00
[52] U.S. Cl. ....................... 324/247; 33/319; 33/355 R; 324/208; 324/346; 364/559
[58] Field of Search ............... 324/207, 208, 244, 247, 324/331, 345, 346; 33/304, 319, 320, 328, 352, 355 R, 361, 362; 364/449, 559; 166/66.5; 175/45

[56] References Cited

U.S. PATENT DOCUMENTS

| 3,942,258 | 3/1976 | Stucki et al. .......................... 33/361 |
| 4,462,165 | 7/1984 | Lewis .................................... 33/361 |
| 4,492,923 | 1/1985 | Byram ............................. 324/247 X |
| 4,539,760 | 9/1985 | Marchent et al. ................ 33/361 X |
| 4,656,750 | 4/1987 | Pitt et al. ......................... 324/247 X |

FOREIGN PATENT DOCUMENTS

| 3308717 | 9/1984 | Fed. Rep. of Germany ...... 324/247 |
| 0604329 | 7/1948 | United Kingdom . |
| 0853942 | 11/1960 | United Kingdom . |
| 1449869 | 9/1976 | United Kingdom . |
| 1461301 | 1/1977 | United Kingdom . |
| 1603873 | 12/1981 | United Kingdom . |

Primary Examiner—Gerard R. Strecker
Attorney, Agent, or Firm—Sheldon Kanars; John T. Rehberg

[57] ABSTRACT

The orientation of a moving platform with respect to a magnetic field is determined by rotating a 3-component vector magnetometer mounted on the platform about at least two axes in the magnetic field. Changes in the signals from the magnetometer are monitored, and the direction of the magnetic field relative to the platform is computed from the signal changes. It is not necessary to know the DC bias of each magnetometer channel or the component of the background magnetic field along each axis of the magnetometer.

11 Claims, 1 Drawing Sheet

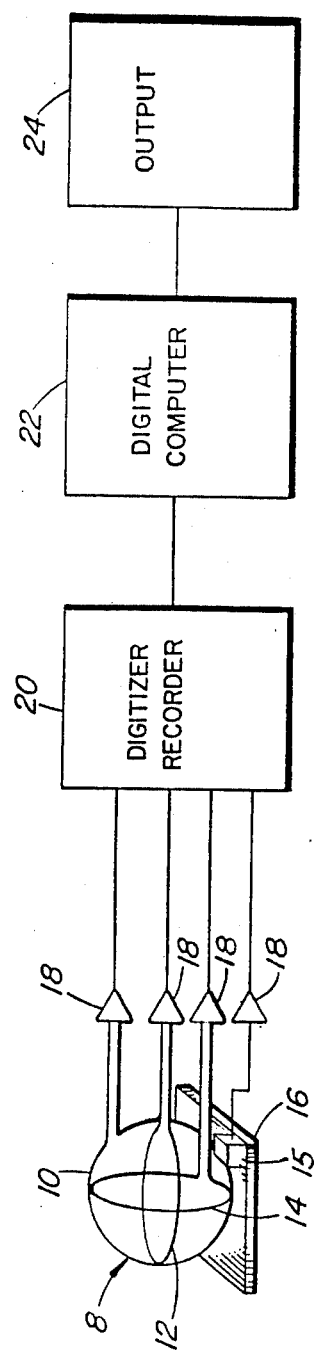

PRECISION MAGNETOMETER ORIENTATION DEVICE

BACKGROUND OF THE INVENTION

Field of the Invention

The present invention relates to an apparatus and a method for determining the orientation of a three component vector magnetometer relative to a total magnetic field vector such as the earth's magnetic field.

In many applications, for example, in geophysical surveys from moving platforms, it is essential to continuously determine the orientation of measuring instruments with respect to a geographic coordinate system (north-south, east-west, vertical) or to the earth's magnetic field direction. One approach to solving this problem is the use of magnetic compasses, including up to three-component flux-gate vector magnetometers.

Conventionally, in order to use magnetometer signals to determine orientations, it is necessary to know the component of the background magnetic field along each axis of the magnetometer, and to do this the DC-bias or response to zero field must be known for each channel. This is particularly true when signals from the three channels of a vector magnetometer are compared with each other, as they must be when the magnetometer rotates in a magnetic field.

While the DC-bias is a problem in any system, it is particularly severe with magnetometers that are based on super conducting quantum interference devices (SQUIDS). Unlike previous magnetometers, SQUID systems have a response to the magnetic field which is cyclic in magnetic field strength. This is due to the quantum nature of the system. Such magnetometers may include a counter to remember the number of cycles, but this is not entirely satisfactory. The counter may reset to zero whenever the power is removed, may be reset to zero at any time, may have been set to the wrong value initially, or may occasionally forget a cycle. These all result in unknown and occasionally changing offsets resulting in the DC-bias.

SUMMARY OF THE INVENTION

The primary object of the present invention is therefore to provide an apparatus and a method for using a three-component vector magnetometer sensitive to strength and direction of the magnetic field to determine with high precision the orientation of the magnetometer relative to the total magnetic field vector.

The present invention provides apparatus for determining the orientation of a moving platform with respect to a magnetic field and includes a three component vector magnetometer mounted on the platform. The magnetometer has three output signals representing the magnetic field strength in respective substantially orthogonal directions. A monitoring device monitors changes in the output signals due to changes in the platform orientation in the magnetic field, and the signal changes are applied to a computing device which determines the direction of the magnetic field relative to the platform.

The present invention also provides a method of determining the orientation of a three axis vector magnetometer in a magnetic field. This is achieved by causing the magnetometer to rotate about at least two substantially orthogonal axes, measuring the changes in the magnetometer outputs, and determining from the measured changes in the magnetometer outputs the orientation of the magnetometer with respect to the magnetic field.

Thus, with the present apparatus and method, the absolute values of the magnetic field components need not be known. Only the changes in the magnetometer response due to the fluctuations in the orientation need be known. This readily permits the use of superconducting magnetometers or induction coils as the magnetic field component sensors. For applications requiring all three degrees of angular motion to be determined one other sensor is required, for example, one to determine the vertical direction.

BRIEF DESCRIPTION OF THE DRAWING

The accompanying drawing is a schematic illustration and block diagram of an exemplary embodiment of a system employing the present invention.

DESCRIPTION OF THE PREFERRED EMBODIMENT

The illustrated embodiment has a sensor assembly 8 with sensors in the form of air-cored coils 10, 12 and 14 arranged to receive the three orthogonal magnetic field components. In other embodiments these may be in the form of super conducting magnetometers, ferromagnetic cored induction coils or flux-gate magnetometers. The sensors measure fluctuations in the three independent components of the magnetic field vector as the platform 16 to which the sensors are rigidly attached, undergoes small angular fluctuations. An additional sensor 15 is optionally mounted on the platform 16. This may be a conventional device such as a pendulum or angular rate sensor. The output of the sensor 15 is used where all three degrees of angular motion of the platform are to be determined. Signals from the sensors are amplified by respective amplifiers 18 and supplied to a digitizer and recorder 20. The digitizer and recorder converts the analogue signals from the sensors 10, 12 and 14 to digital form and records the digitized signals. The digitized signals are also fed to a digital computer 22, which processes the signals in a manner to be described to derive the orientation of the sensor assembly 8 and thus the platform 16 with respect to the ambient magnetic field vector. The parameters computed by computer 22 are sent to an output device 24. This output device may be a recorder making a record in some form for applying corrections to other instrument readings, or a control mechanism for controlling the orientation of the platform 16 to which the magnetometers are rigidly attached.

The magnetometer outputs may be recorded in recorder 20 together with other data for subsequent processing in a digital computer to correct other data for the dynamic platform orientation or to relate other information to the platform orientation.

Of importance to the practice of this invention are the methods used to derive the orientation of the sensor assembly 8 from fluctuations in its orientation. Two such methods are described in the following. In addition to allowing the determination of the sensor orientation relative to a magnetic field, these methods can be used to update the DC-bias offsets, which is of particular importance in SQUID systems.

In the first method, the correlated fluctuations of the three signals from the magnetometers are used to find the average direction of the magnetic field vector relative to the magnetometer axes. The offsets in each channel are then calculated from the average direction and strength of the applied magnetic field. This method is applicable when the magnetometer is rotating through $\leq 4°$ around at least two axes.

The second method makes use of the fact that the total measured magnetic field strength does not change as the magnetometer rotates in a non-varying magnetic field. The procedures for implementing this method give the magnetometer offsets directly and may be applied for arbitrarily large rotations. Again, there must be rotations around at least two axes for this method to be applied.

MATHEMATICAL DEFINITIONS

The symbol ∧ above a quantity denotes a unit vector.

Because of the many matrix multiplications required in this analysis, the summation convention is used: if a subscript appears more than once in an expression a sum is automatically performed on that subscript. For example $$\vec{a} \cdot \vec{b} = a_k b_k = \sum_{K=1}^{3} a_k b_k$$

The totally antisymmetric symbol $\epsilon_{ijk}$ is used where vector cross products are calculated. It is defined by $$\epsilon_{123} = 1,$$

$$\epsilon_{ijk} = -\epsilon_{jik}$$

Thus, $\epsilon_{123} = \epsilon_{231} = \epsilon_{312} = 1$, $\epsilon_{213} = \epsilon_{132} = \epsilon_{321} = -1$. The other 21 numbers $\epsilon_{ijk}$ are zero There are three sets of axes of concern:

(i) Space-fixed axes: $\hat{u}_1$=north, $\hat{u}_2$=west, $\hat{u}_3 = \hat{U}_1 \times \hat{U}_2 =$ Up.

(ii) Body-fixed axes: $\hat{e}_1$=forward, $\hat{e}_2$=left, $\hat{e}_3 = \hat{e}_1 \times \hat{e}_2$.

(iii) The magnetometer axes $\hat{f}_j$, j=1,2,3. It is assumed that the gain of each magnetometer component is known accurately.

The rotation matrix $R_{kj}$ is defined by $$\hat{e}_j = R_{kj} \hat{u}_k$$

and $$\hat{u}_k = R_{jk} \hat{e}_j.$$

Another matrix S relates the vectors $\hat{f}_k$ and $\hat{e}_j$:

$$\hat{f}_j = S_{kj} \hat{e}_k$$

and $$\hat{e}_k = (S^{-1})_{jk} \hat{f}_j.$$

It is not assumed here that $(S^{-1})_{jk} = S_{kj}$ because the vectors $\hat{f}_j$ are not necessarily orthogonal and hence S is not usually a rotation matrix.

The output of the magnetometer consists of three time series (one for each magnetometer component)

$$s_j(t) = \hat{f}_j(t) \cdot \vec{B} - C_j, j = 1,2,3,$$

when $\vec{B}$ is the magnetic field. This equation defines the unknown offsets $C_j$. Finding these offsets or, equivalently, determining the orientation of the magnetometer by calculating $\hat{f}_j(t)$ solves the problem.

The first method presented here shows how to determine the orientation of the magnetometer when it is rotating through small angles and the second may be used for large angles. Both methods assume that the vector magnetometer has been calibrated so the gain and sensitive axis are known for each of the three channels. Methods for obtaining such a calibration are known, and are not discussed here.

SMALL-ANGLE METHOD

Use is made of the normalized fluctuation of the signals $s_j$:

$$\Delta_j(t) = \frac{s_j(t) - \langle s_j \rangle}{B_o} = \frac{\vec{B} \cdot (\hat{f}_j(t) - \langle \hat{f}_j \rangle)}{B_o}$$

where $\langle s_j \rangle$ denotes a time average of the signal $s_j$, and $B_o = |\vec{B}|$ is the strength of the applied field. In most cases where this algorithm is to be applied, $\vec{B}$ will be the earth's magnetic field. It will be shown that a suitable average of the cross products of the vectors gives the time-average direction of $\vec{B}$ in the system of axes attached to the magnetometer.

From the definitions of matrices S and R, $$\Delta_j(t) = S_{kj}(R_{lk} - \langle R_{lk} \rangle) \frac{\hat{u}_l \cdot \vec{B}}{B_o}$$

$$= S_{kj}(R_{lk} - \langle R_{lk} \rangle) a_l$$

The vector $\hat{a}$ points in the direction of $\vec{B}$ and $a_l = \hat{a} \cdot \hat{u}_l$. The value $\langle R_{lk} \rangle$, the time average of the rotation matrix $R_{lk}$, is not usually a rotation matrix. However, a rotation matrix $Q_{lk}$ may be found which is close to $R_{lk}$:

$$\langle R_{lk} \rangle a_l = \alpha Q_{lk} a_l = \alpha b_k^o$$

vector $b^o$ is the unit vector giving the average (and, at this point, unknown), direction of the magnetic field $\vec{B}$ in the rotating, body-fixed, axes. It is related to the unit vector $\hat{e}_k$ by $$b^o = b_k^o \hat{e}_k$$

The difference between the number $\alpha$ and 1 is of order var($\theta$) where $\theta$ is the rotation angle of the body-fixed axes relative to the space-fixed axes. In addition any rotation $R_{lk}$, can be expressed as the rotation $Q_{kl}$ followed by another smaller rotation $R'_{lk}$:

$$\Delta_j(t) = S_{kj}(R'_{lk} - \alpha \delta_{lk}) Q_p a_p$$

$$= S_{kj}(R'_{lk} - \alpha \delta_{lk}) b^o$$

The matrix $R_{lk}$ for the small rotations about the average rotation $Q_{lk}$ can be written in terms of an angle of rotation $\theta$ and an axis n:

$$R_{lk}' = \cos \theta \delta_{lk} + \sin \theta \epsilon_{lik} n_i + (1 - \cos \theta) n_l n_k$$

Substitute this expression for $R'_{lk}$ in the previous equation for $\Delta_j(t)$ and calculate the cross-product $\vec{\Delta}(t_1) \times \vec{\Delta}(t_2)$ $$[\vec{\Delta}(t_1) \times \vec{\Delta}(t_2)]_i = \epsilon_{ijk} \Delta_j(t_1) \Delta_k(t_2) =$$

-continued $$\epsilon_{ijk} [S_{lj} (R'_{ml}(t_1) - \alpha\delta_{ml}) b_m{}^o][S_{nk}(R_{pn}(t_2) - \alpha\delta_{pn}) b_p{}^o] =$$

$$(detS) S_{ir}^{-1} \epsilon_{rln} [(\cos\theta_1 - \alpha) \delta_m + \sin\theta_1 \epsilon_{mtl} n_t(1) + (1 -$$

$$\cos\theta_1) n_m(1) n_l(1)] b_m{}^o \cdot [(\cos\theta_2 -$$

$$\alpha) \delta_{pn} - \sin\theta_2 \epsilon_{psn} n_s(2) + (1 - \cos\theta_2) n_p(2) n_n(2)] b_p^o.$$

Here detS = determinant of matrix S. This equation is exact. The next step is to make the small angle expansion in terms of the vector $\vec{\eta} = \theta \hat{n}$:

$$[\Delta(t_1) \times \Delta(t_2)]_i = (detS) S_{ir}^{-1} \epsilon_{rln} \left[ \left(1 - \alpha - \frac{n^2(1)}{2}\right)\delta_{ml} - \right.$$

$$\left. \epsilon_{mtl} n_t(1) + \frac{1}{2} n_m(1) n_l(1)\right] b_m{}^o \cdot \left[\left(1 \cdot \alpha - \frac{n^2(2)}{2}\right)\delta_{pn} + \right.$$

$$\left. \epsilon_{psn} n_s(2) + \frac{1}{2} n_p(2) n_s(2)\right] b_p^o.$$

The right hand side of this equation is complete through order $\eta_2$ for both expressions in square brackets. Next, this equation is expanded and each term is labelled with its order in $\eta_1$ and $\eta_2$. It is to be recalled that $(1-\alpha)$ is of order $var(\eta) =$ order 2. Also, the usual vector identified cross-products are applied.

|  | Order | |
|---|---|---|
|  | $\eta_1$ | $\eta_2$ |
| $[\vec{\Delta}(t_1) \times \vec{\Delta}(t_2)]_k = (detS) S_{ir}^{-1} [b_r{}^o \hat{b}^o \cdot (\vec{\eta}(1) \times \vec{\eta}(2)]$ | 1 | 1 |
| $+ b_r{}^o \left(\left(1 - \alpha - \frac{\eta^2(1)}{2}\right)\hat{b}^o \cdot \vec{\eta}(2) + \frac{1}{2} (\vec{\eta}(1) \cdot \vec{\eta}(2)(\vec{\eta}(1) \cdot \hat{b}^o)\right)$ | 2 | 1 |
| $- b_r{}^o \left(\left(1 - \alpha - \frac{\eta^2(2)}{2}\hat{b}^o \cdot \vec{\eta}(1) + \frac{1}{2} (\vec{\eta}(1) \cdot \vec{\eta}(2)(\vec{\eta}(2) \cdot \hat{b}^o)\right)\right.$ | 1 | 2 |
| $+ \eta_r(1) \left(\left(1 - \alpha - \frac{\eta^2(2)}{2} + \frac{1}{2} (\vec{\eta}(2) - \hat{b}^o)^2\right)\right)$ | 1 | 2 |
| $- \eta_r(2) \left(\left(1 - \alpha - \frac{\eta^2(2)}{2} + \frac{1}{2} (\vec{\eta}(1) - \hat{b}^o)^2\right)\right)$ | 2 | 1 |
| + terms of order $\eta^4$] | | |

It is desired to show that a suitable average of the cross-products of the $\Delta$ vector can give $\hat{b}^o$, the average direction of $\vec{B}$ in the body-fixed frame. The averaging procedure is the following: we know the direction of $b^o$, approximately (at least to within 90°), so we know whether the lowest order term, $\hat{b}^o \cdot (\vec{n}(1) \times \vec{n}(2))$, is positive or negative. If it is negative change the sign of the cross-product before including it in the average. This procedure means that the signs of the third order terms will be random and the contribution of the third order terms to the average will be zero in the limit where the number of terms in the average is large. Therefore the first error term will have order $\eta^4$ which is two orders of $\eta$ smaller than the leading terms. The result is $$b_r{}^o = \frac{S_{ri} <\vec{\Delta}(t_1) \times \vec{\Delta}(t_2)>_i}{detS}$$

This is what is watned, namely, the direction of the applied magnetic field B in the body-fixed system of axes has been calculated without first knowing the offsets $C_j$. In fact, if $\hat{b}^o$ is known, $C_j$ can be calculated by the following procedure: look through the list of vectors $\vec{\Delta}(t)$ and find the time $t_o$ when $\vec{\Delta}(t_o)$ is smallest (it should be almost zero). Then, from the definitions of vector $\hat{f}_j$ and offset $C_j$ and the definition of vector $\hat{b}^o$, $$C_j = B_o b_r{}^o S_{rj} - S_j(t_o)$$

A more accurate procedure is to note that $b_i(t) = R_{ql}{}^1(t)b_q$ where $R_{ql}'(t)$ is the matrix for the small rotations about the average position, and also that $(R_{lk}'(t) - \alpha\delta_{lk})b^o = S_{jk}^{-1}\Delta_j(t)$. Then, applying the definitions $$\begin{aligned} C_j &= B_o b_r(t) S_{rj} - S_j(t) \\ &= \alpha B_o b_r{}^o S_{rj} + B_o \Delta_j(t) - S_j(t) \\ &\approx B_o b_r{}^o S_{rj} + B_o \Delta_j(t) - S_j(t) \end{aligned}$$

The approximation $\alpha = 1$ has been applied here. This expression is correct to order $|\Delta|^2$.

This procedure can be applied only in the case where a vector magnetometer is undergoing small rotations about at least two axes. The error in the result is of order $\eta^2$ where $\eta$ is the rotation angle in radians. Thus, for example, to know the direction of $b^o$ to within, say 0.2° or 35 mrad, the angles of fluctuation should be $\leq 4°$.

LARGE ANGLE METHOD

If the rotation angles $\theta$ are so large that the approximations $\sin\theta = \theta$ and $\cos\theta = 1 - \theta^2$ are no longer correct (i.e., if $\theta \geq 0.1$ rad), then the procedure outlined in the previous section cannot be used to give $C_j$ and b(t) accurately. In this case, the change in magnetometer outputs is so large that a different approach, based on the fact that the total magnetic field intensity $|\vec{B}|$ does not change in a rotation, may be used.

To begin with, define a set of vectors $\vec{g}_j$:

$$\vec{g}_j = \frac{\epsilon_{jkl}\hat{f}_k \times \hat{f}_l}{2\hat{f}_1 \cdot (\hat{f}_2 \times \hat{f}_3)}$$

The vectors $g_j$ have the property $$\vec{g}_j \cdot \vec{f}_k = \delta_{jk}$$

and may be considered the basis dual or conjugate or reciprocal to the basis $\hat{f}_j$. If the basis $\hat{f}_j$ is orthogonal, then $\vec{g}_j = \hat{f}_j$, but this is not often the case for a real magnetometer.

Then from the definition of the offsets $C_j$, $$\vec{B} \cdot \hat{f}_j(t) = S_j(t) + C_j$$

In the magnetometer frame, it is $\vec{B}$ that is time dependent, so this equation is rewritten:

$$\vec{B}(t) \cdot \hat{f}_j = S_j(t) + C_j$$

and applying the definition of $\vec{g}_j$ $$\vec{B}(t) = (S_j(t) + C_j)\vec{g}_j$$

The magnitude of vector $\vec{B}$ is invariant so $|B|^2$ is time independent, $$B^2 = (S_j(t) + C_j)\vec{g}_j \cdot \vec{g}_k(S_k(t) + C_k)$$
$$= S_j(t) M_{jk} S_k(t) + 2C_j M_{jk} S_k(t) + C_j M_{jk} C_k$$

where the matrix $M_{jk} = \vec{g}_j \cdot \vec{g}_k$ has been introduced. The problem then is to find offsets $C_j$ which make the right side of the previous equation time-independent.

To do this, choose samples of the magnetometer output $s_j$ at four points $t_\mu$, $\mu = 0, 1, 2, 3$. The samples must be chosen so the vectors $s_j$ are not all coplanar. Non-coplanarity ensures that the three vectors $\sigma_j(t_\mu) = S_j(t_\mu) - S_j(t_o), \mu = 1, 2, 3$ are independent. Define quantities G and H by $$G(t_\mu) = S_j(t_\mu) M_{jk} S_k(t_\mu) - S_j(t_o) M_{jk} S_k(t_o)$$

$$H_j(t_\mu) = M_{jk}[S_k(t_\mu) - S_k(t_o)]$$

Then for an acceptable set of offsets $C_j$ and from the requirement that $B^2$ is time-independent, $$0 = B^2(t_\mu) - B^2(t_o)$$
$$0 = (S_j(t_\mu) M_{jk} S_k(t_\mu) + 2C_j M_{jk} S_H(t_\mu) + C_j M_{jk} C_k)$$
$$\quad - (S_j(t_o) M_{jk} S_k(t_o) + 2C_j M_{jk} S_k(t_o) + C_j M_{jk} C_k)$$
$$= G(t_\mu) + 2C_j H_j(t_\mu) \quad \mu = 1, 2, 3$$

Since $G(t_\mu)$ and $\vec{H}(t_\mu)$ are simple functions of the data $s_j(t_\mu)$, the previous equation is a set of three simultaneous equations in the three unknown offsets $C_j$, $j = 1, 2, 3$. As long as the vectors $\vec{H}(t_\mu)$ are independent, the offsets can be calculated, and the requirement that the four points be non-coplanar ensured the independence of $\vec{H}(t_1), \vec{H}(t_2), \vec{H}(t_3)$. Therefore the problem is solved because the offsets can be calculated.

This is, however, not the limit of this method. Usually there is noise in the data and it is possible to include more points (i.e. $N > 4$) in the analysis and then to determine the best values of $C_j$ by a straight forward least squares minimization. This is straight forward but the algebra is included here.

For the least square solution, the deviation of $B^2(t)$ from a constant must be minimized. This is done by minimizing the following sum;

$$F = 4 \sum_{\mu=1}^{N-1} [G(t_u) + 2C_j H_j(t_u)^2].$$

This equivalent to finding where the gradient of F is zero:

$$\frac{\partial F}{\partial C_k} = 4 \sum_{\mu=1}^{N-1} G(t_u) H_k(t_u) + 8 \sum_{\mu=1}^{N} H_k(t_u) H_j(t_u) C_j$$
$$= 4(T_k + N_{kj} C_j) = 0$$

In the last line the vector $T_k$ and the matrix $N_{kj}$ have been defined as sums over the $N-1$ points $t_\mu$. The solution for $C_j$ is then given by solving this set of simultaneous equations.

The invention, unlike the prior art, does not require that the absolute value of the magnetic field components be measured, but rather, that only the changes due to platform motion be recorded. Thus the invention is particularly suited to, say, towed air, sea, or land vehicles which undergo random motions.

What is claimed is:

1. Apparatus for determining the orientation of a moving platform with respect to a magnetic field vector comprising:

a three component magnetic field sensor mounted on said platform, said sensor having a first plurality of vector output signals corresponding to said magnetic field vector at various moments of time; and computer means programmed for receiving and averaging said first plurality of output signals to obtain a time-average vector;

subtracting said time average vector from each of said vector output signals to obtain a second plurality of normalized vectors;

selecting pairs of said normalized vectors;

calculating the cross products of each of said pairs of normalized vectors to obtain third and fourth pluralities of vectors, said third plurality being generally parallel to the direction of said magnetic field vector and said fourth plurality being generally antiparallel to the direction of said magnetic field vector;

averaging said third plurality of vectors to obtain a first vector which is closely parallel to said magnetic field vector.

2. The apparatus of claim 1 including a sensor for determining a space fixed direction relative to the platform.

3. The apparatus according to claim 1 wherein the magnetometer includes three induction coils arranged substantially orthogonally.

4. The apparatus according to claim 3 wherein the induction coils have ferromagnetic cores.

5. The apparatus according to claim 3 wherein the induction coils are air-cored.

6. The apparatus according to claim 1 wherein the magnetometer is a superconducting quantum interference device.

7. The apparatus according to claim 1 wherein the magnetometer is a fluxgate vector magnetometer.

8. The apparatus according to claim 1 including amplifier means for amplifying said output signals, and means for digitizing said signals for said computing means.

9. The apparatus according to claim 1 wherein said computer means is further programmed to:
average said fourth plurality of vectors to obtain one vector which is closely antiparallel to said magnetic field vector;
multiply said antiparallel vector by −1 to obtain a second vector which is closely parallel to said magnetic field vector; and
average said first and second closely parallel vectors to obtain a final vector which is closely parallel to said magnetic field vector.

10. The apparatus according to claim 1 wherein said computer means is further programmed to:
multiply each vector of said fourth plurality of vectors by −1 to obtain a fifth plurality of vectors which are generally parallel to said magnetic field vector;
average said fifth plurality of vectors to obtain a second vector which is closely parallel to said magnetic field vector; and
average said first and second closely parallel vectors to obtain a final vector which is closely parallel to said magnetic field vector.

11. Apparatus for determining the orientation of a moving platform which respect to a magnetic field vector comprising:
a three component vector magnetometer, each of said three components of said magnetometer having outputs corresponding to projections of said magnetic field vector in particular directions, said three directions being non-coplanar, said outputs at selected moments of time being a first plurality of output vectors;
means for receiving and averaging said first plurality of output vector signals to obtain a time-average vector;
means for subtracting said time average vector from each of said vector output signals to obtain a second plurality of normalized vectors;
means for selecting pairs of normalized vectors;
means for producing a third plurality of vectors, each vector of said third plurality being perpendicular to a said selected pair of said normalized vectors; and
means for averaging said third plurality of vectors to obtain a final vector which is closely parallel to said magnetic field vector.

* * * * *